United States Patent [19]

Foster

[11] Patent Number: 5,096,034

[45] Date of Patent: Mar. 17, 1992

[54] REVERSING CLUTCH MECHANISM

[75] Inventor: Daniel S. Foster, Grosse Pointe Woods, Mich.

[73] Assignee: Rotary Specialties, E. Detroit, Mich.

[21] Appl. No.: 670,043

[22] Filed: Mar. 15, 1991

[51] Int. Cl.⁵ .................. F16D 21/04; F16D 11/06; F16H 3/14

[52] U.S. Cl. .................. 192/51; 192/93 A; 192/107 R; 192/113 B; 74/377

[58] Field of Search .............. 192/21, 51, 93 R, 93 A, 192/107 R, 113 B; 74/355, 376, 377, 378

[56] References Cited

U.S. PATENT DOCUMENTS

| | | | |
|---|---|---|---|
| 2,045,452 | 6/1936 | Emrick | 192/107 R |
| 3,073,424 | 1/1963 | Russell | 192/113 B |
| 3,119,277 | 1/1964 | Ziegler | 192/93 R X |
| 3,212,349 | 10/1965 | Bergstedt | 74/378 |
| 3,269,497 | 8/1966 | Bergstedt | 192/51 |
| 3,915,270 | 10/1975 | Miller | 192/21 |
| 4,630,719 | 12/1986 | McCormick | 192/21 |
| 4,679,673 | 7/1987 | Yamaoka et al. | 192/21 |
| 4,679,682 | 7/1987 | Gray, Jr. et al. | 192/21 |
| 5,006,085 | 4/1991 | Bland et al. | 74/378 X |

FOREIGN PATENT DOCUMENTS 190266  6/1964  Sweden .................. 192/51

Primary Examiner—Richard Lorence
Attorney, Agent, or Firm—Reising, Ethington, Barnard, Perry & Milton

[57] ABSTRACT

A reversing clutch mechanism (10) for use in a transmission (12) of the type having a continuously rotating input shaft (52) and a rotatable output shaft (20). A pair of friction clutches (48, 50) are rotatably disposed on the output shaft (20) and are continuously driven in opposite reverse and forward rotational directions by gears (54, 58) and sprockets (60, 62) associated with the input shaft (52). A double friction cope (94) is helically splined on the output shaft (20) and moveable toward and away from the friction clutches (48, 50) for selective frictional engagement with either friction clutch (48 or 50) to cause the output shaft (20) to rotate in either a forward or reverse rotational direction. The double cone (94) includes a peripheral shifting groove (112) having oppositely inclined side walls (114) which cooperate with a shifting pin (120) disposed in the groove (112) to disengage the double cone (94) and the friction clutch (48 or 50). The double cone (94) also includes a ridge (148) disposed in the groove (112) and having a concentric top surface (150) to prevent the shifting pin (120) from extending into the groove (112) beyond the top surface (150).

28 Claims, 4 Drawing Sheets

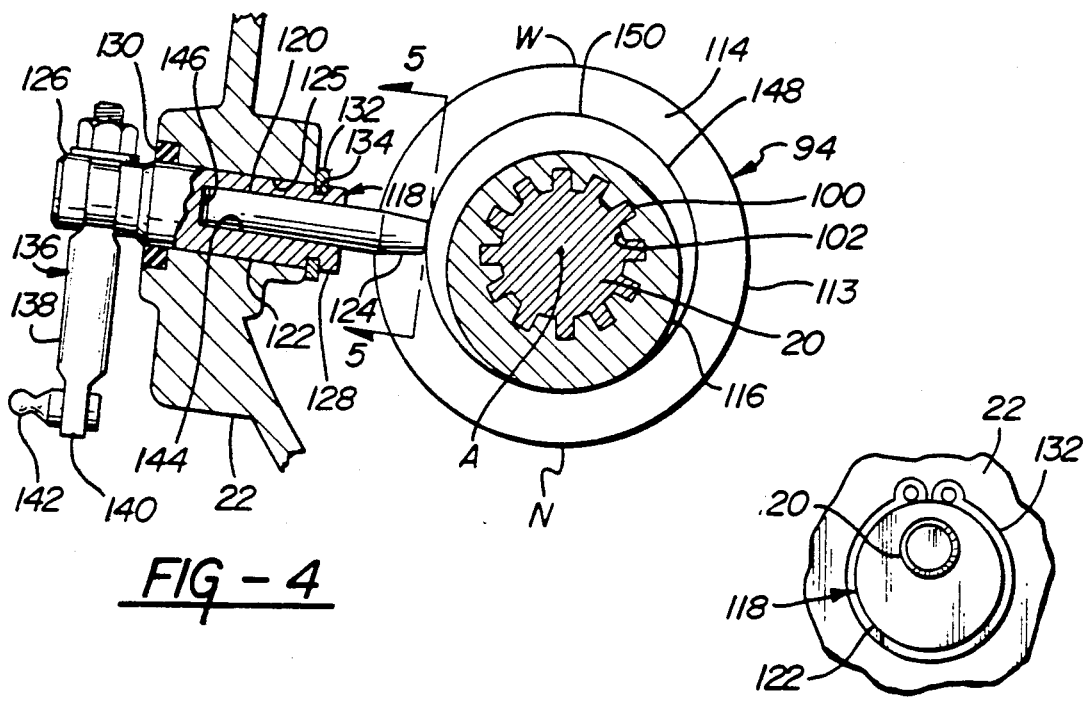
FIG-4
FIG-3
FIG-5
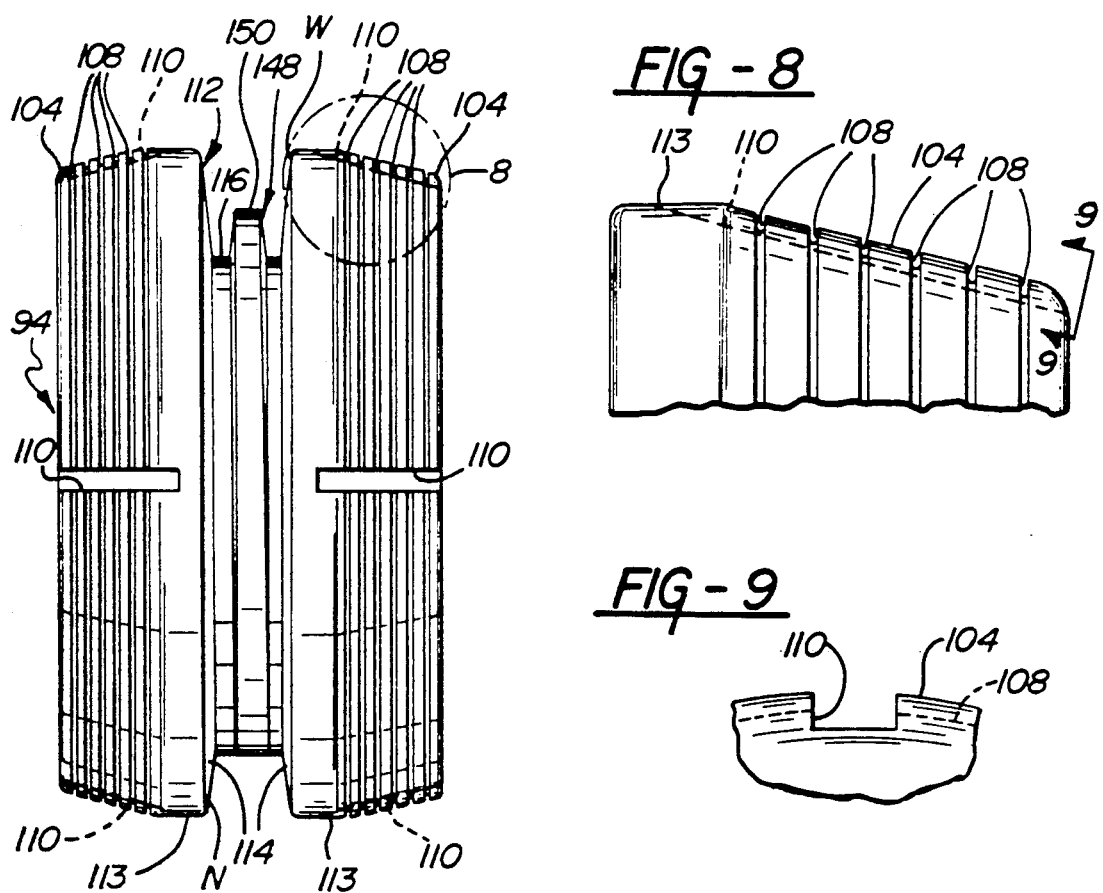
FIG-8
FIG-9

REVERSING CLUTCH MECHANISM

BACKGROUND OF THE INVENTION

1. Field of the Invention

The present invention relates generally to a reversing clutch mechanism for transmissions, and more particularly to a reversing clutch mechanism for marine transmissions of the type of having a pair of continuously driven friction clutches freely rotatably disposed on an output shaft and an intermediate clutch element axially moveable along the output shaft into selective frictional engagement with one or the other of the clutch members to rotate the output shaft in either a forward or reverse rotational direction.

2. Description of Prior Art

Reversing clutch mechanisms are commonly used in marine transmissions to selectively couple an engines drive shaft and a prop shaft to rotate the prop shaft in either a forward or reverse rotatational direction. A propeller is mounted to the free end of a prop shaft to propel the vessel in either a forward or reverse direction. These types of clutch mechanisms typically comprise a pair of oppositely driven clutches freely rotatably disposed on an output shaft coupled to the prop shaft. A coupling element is helically splined on the output shaft between the friction clutches and is moveable therealong toward and away from each friction clutch. The coupling element is provided with frictional engaging surfaces for engaging one or other of the friction clutches to rotate the prop shaft in either the forward or reverse rotational direction. At the moment the coupling element engages one of the clutches, the rotation of the propeller in the water transmits a torque to the prop shaft (and thus the output shaft). As a result, the output shaft attempts to rotate relative to the engaged coupling element causing the coupling element to be further urged into engagement with the clutch due to the helical spline connection between the output shaft and the coupling element. As the rotational speed of the prop shaft is increased, the torque transmitted to the shaft is also increased thereby urging the coupling element into tighter engagement with the friction clutch. Although this type of clutch mechanism has the advantage of virtually eliminating any possibility of clutch slippage because of the extremely tight engagement between the coupling element and the friction clutch, it also has the inherent disadvantage of being extremely difficult to disengage. That is, in addition to having to overcome the force of frictional engagement, the torque force transmitted through the prop shaft must also be overcome in order achieve disengagement. Of course, decreasing the rotational speed of the prop shaft prior to attempting disengagement helps, but a certain amount of torque always remains to be overcome before disengagement can be achieved.

Once solution to this problem is disclosed in the U.S. Pat. Number 3,269,497 to Bergstedt, issued Aug. 30, 1966. In this reverse clutch mechanism, the rotational power of the vessel's engine is utilized to achieve disengagement. Specifically, the coupling element is provided with a peripheral eccentric V-groove having side walls which axially reciprocate with rotation of the coupling element. A spring biased, wedge-shaped sliding pin extends into the groove and is moveable toward the side walls for engagement therewith. When the pin is urged against a side wall of the groove, the reciprocating camming action of the side wall against the pin urges the coupling element out of engagement with the friction clutch and into a neutral condition. However, with this system, the sliding pin has a tendency to get wedged or caught up in the groove. More particularly, the wedge-shaped sliding pin is forced down into the groove and into contact with the side walls by means of a spring and follows the eccentricity of the groove when the coupling element is engaged and rotating. This condition enables the sliding pin to stick or become wedged between the rotating side walls of the groove resulting in poor performance and likely damage to the clutch assembly.

SUMMARY OF THE INVENTION AND ADVANTAGES

The subject invention provides a clutch assembly having a rotatable output shaft defining an axis or rotation and continuously driven clutch means freely rotatably disposed on the output shaft. The assembly further includes coupling means disposed on the output shaft and moveable axially therealong toward and away from the clutch means. The coupling means is engagable with the clutch means for selectively coupling the continuously driven clutch means and the output shaft to rotate the output shaft. The coupling means includes a peripheral shifting groove defined by a pair of axially reciprocable side walls and an eccentric bottom wall eccentrically disposed about the axis of rotation and defining a variable depth of the groove. Shift means are disposed in the groove and moveable along the longitudinal axis to selectively engage the side walls for shifting the coupling means into and out of engagement with the clutch means. The assembly is characterized by including annular ridge means disposed in the groove concentrically about the axis of rotation. The ridge means has a concentric top surface defining a uniform depth of the groove at least partially above the eccentric bottom wall of the groove for continuously limiting the extension of the shift means into the groove beyond the top surface of the ridge means.

The instant invention thus has the advantages of providing a simply constructed, low cost reversing clutch mechanism which overcomes the deficiencies of the prior art by providing ridge means for preventing the shifting means from sticking and becoming wedged in the peripheral groove during rotation of the coupling means to achieve superior performance and eliminate the possibility of damage to the assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front view of a double cone of the subject invention;

FIG. 4 is a fragmentary cross-sectional side view taken substantially along lines 4—4 of FIG. 1 showing the shifting pin disposed in the shifting groove of the double cone;

FIG. 5 is a front view taken substantially along lines 5—5 of FIG. 4 showing the shifting pin eccentrically mounted within the control shaft;

FIG. 8 is an enlarged fragmentary front view of the circumscribed portion of FIG. 3; and FIG. 9 is a fragmentary side view taken substantially along lines 9—9 of FIG. 8.

DETAILED DESCRIPTION OF THE DRAWINGS

Figure 1:
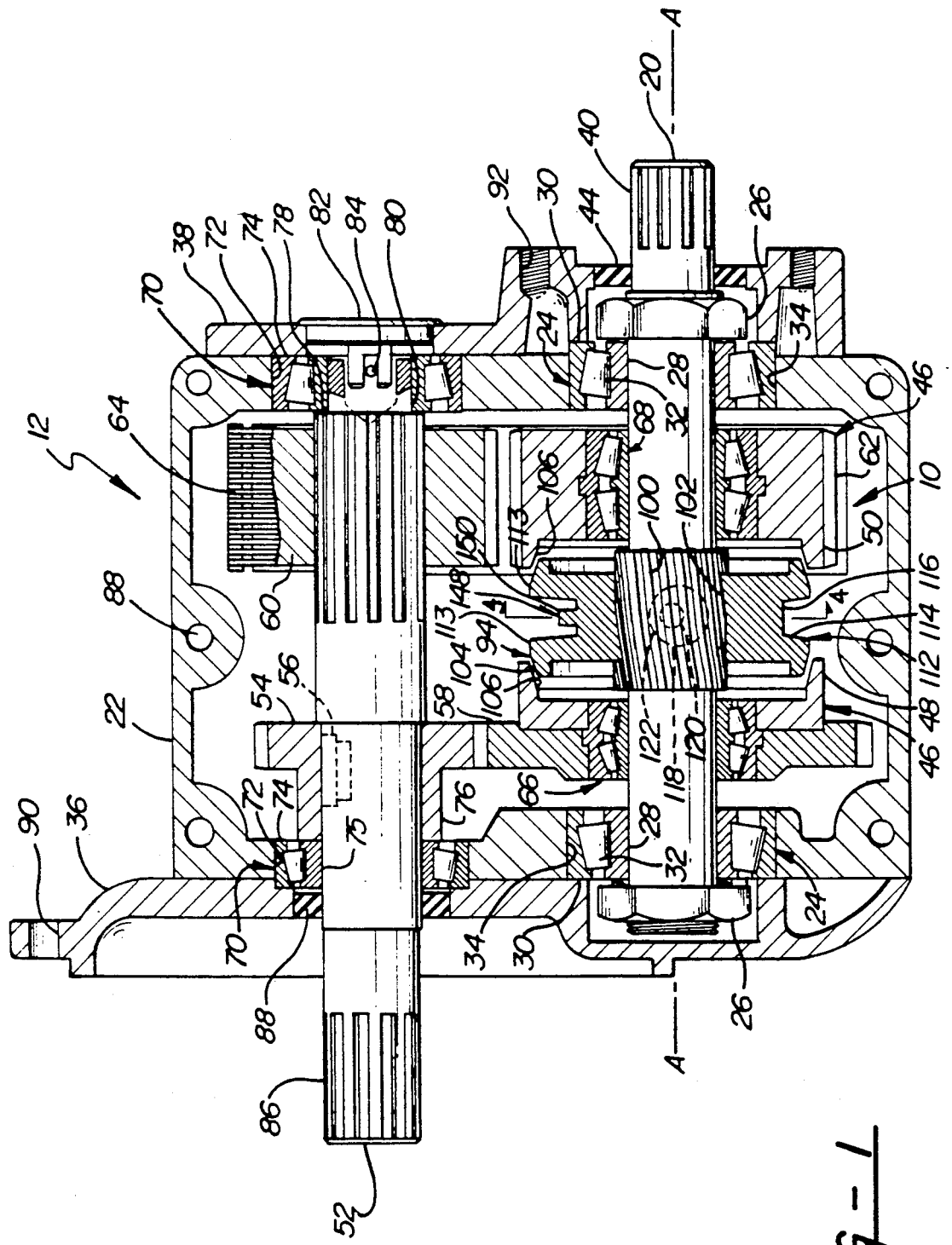
FIG. 1 is a cross-sectional front view of a marine transmission including the subject reversing clutch mechanism.
Figure 2:
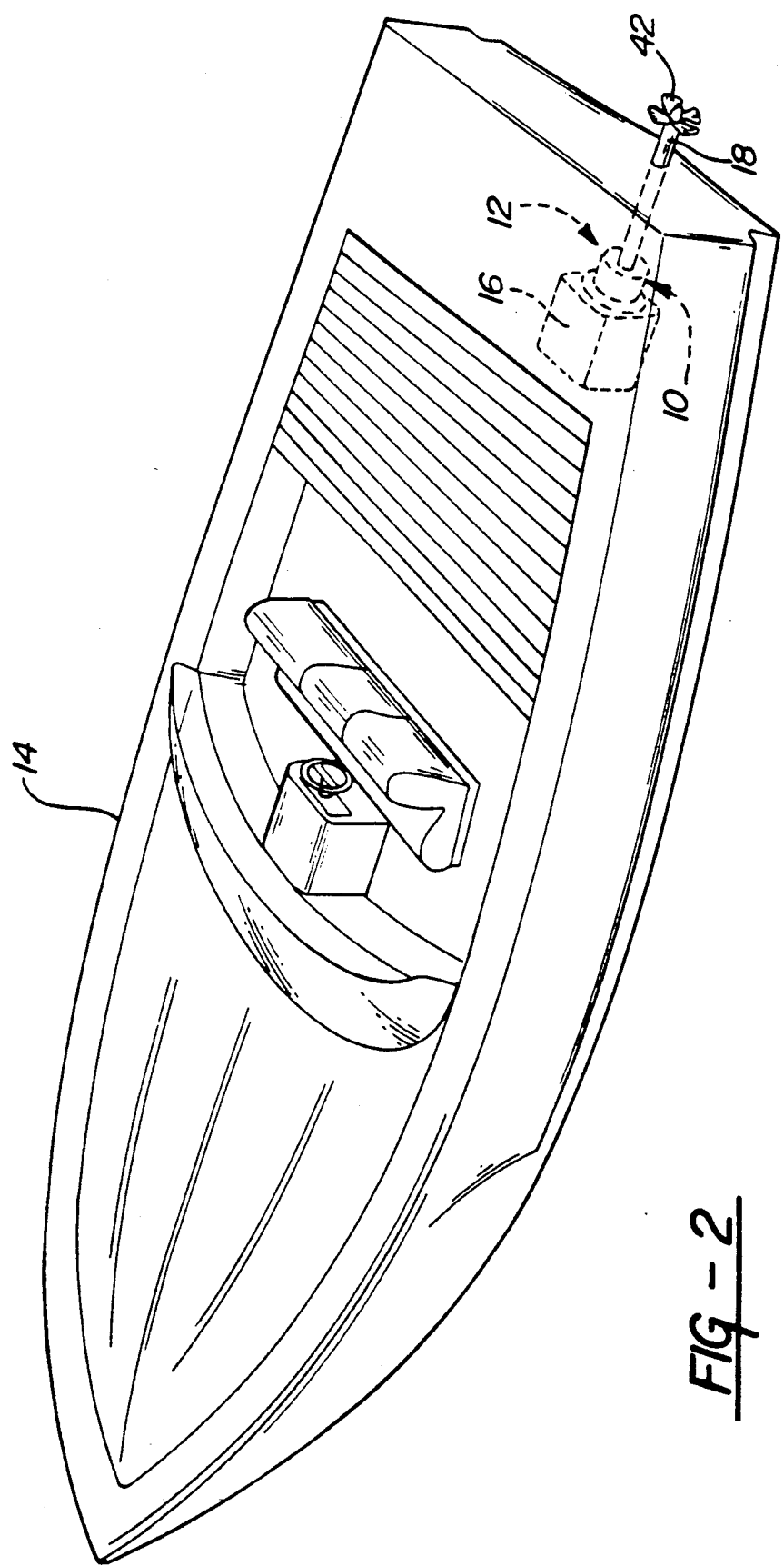
FIG. 2 is a schematic perspective view of a vessel in which the subject reversing clutch assembly is employed.

Referring to FIG. 1, a preferred embodiment of a reversing clutch mechanism constructed in accordance with the present invention is generally shown at 10 as part of a marine transmission 12 of the type used in marine vessels 14 to transmit power from an engine 16 to a prop shaft 18 (FIG. 2).

The clutch assembly 10 comprises a rotatable output shaft 20 rotatably supported within a transmission casing 22 by a pair of bearings 24 and defining a longitudinal axis of rotation A about which the output shaft 20 may rotate. The output shaft 20 is supported against axial movement relative to the casing 22 by a pair of threaded nut members 26 threadably secured on the output shaft 20 and tightened against associated bearings 24. The bearings 24 are preferably tapered bearings having conical inner 28 and outer 30 braces capturing a plurality of rollers 32 therebetween. The bearings 24 are press fit into bearing seats 34 formed in the casing 22 with the outer races 30 of the bearings 24 being supported axially by front 36 and rear 38 end plates of the casing 22. The inner races 28 are axially supported by the aforementioned nut members 26 tightened thereagainst. One end of the output shaft 20 extends from the casing 22 and is splined at 40 for connection to the prop shaft 18 of FIG. 2. The prop shaft 18 includes propeller 42 which rotates with the prop shaft 18 to propel the vessel 14. A lip seal 44 is disposed between the casing 22 and the output shaft 20 where the output shaft 20 extends out of the casing 22 to prevent transmission fluid from escaping out of the casing 22 and for preventing the ingress of foreign matter into the casing 22.

The clutch assembly 10 further includes continuously driven clutch means 46 freely rotatably disposed on the output shaft 20 by bearings 66, 68. The clutch means 46 comprises a pair of friction clutches 48, 50 continuously rotatably driven on the output shaft 20 in opposite forward and reverse rotational directions. The friction clutches 48, 50 are driven by means of an input shaft 52 coupled to and continuously rotated by the engine 16. The rotational motion of the input shaft 52 is transferred to the friction clutches 48, 50 by gears 54, 58 and sprockets 60, 62 associated with the input shaft 52. More specifically, an input gear 54 is fixedly disposed on the input shaft 52 by key 56 for rotation with the input shaft 52. A corresponding output gear 58 is freely rotatably disposed on the output shaft 20 by bearing 66 and permanently coupled to the friction clutch 48 such as by welding. The rotating input gear 54 and the output gear 58 are disposed in meshing engagement to continuously rotate the output gear 58, and thus the friction clutch 48, freely on the output shaft 20 in a rotational direction opposite the rotational direction of the input shaft 52. For instance, if the input shaft 52 is normally rotating in a counter clockwise rotational direction, the friction clutch 48 is caused to rotate in an opposite clockwise direction on the output shaft 20.

The input shaft 52 also has an input sprocket 60 fixedly splined on the input shaft 52 in spaced relationship to the input gear 54 and rotates with the output shaft 52. A corresponding output sprocket 62 is freely rotatably disposed on the output shaft 20 by bearing 68 in spaced relationship to the output gear 58 and forms an integral portion of the other friction clutch 50. The rotational motion of the input shaft 52 is transferred to the friction clutch 50 by an inverted tooth "silent" chain 64 coupling the input 60 and output 62 sprockets to continuously rotate the friction clutch 50 in the same direction as the input shaft 52 and oppositely of the outer friction clutch 48. Thus, if the input shaft 52 is normally rotating in a counter clockwise rotational direction, the friction clutch 50 is caused to rotate in the same counter clockwise direction (opposite the clockwise direction of the other friction clutch 48). For simplicity, the friction clutch 48 (driven in the clockwise rotational direction) will be referred to as the reversely driven frictional clutch 48 and the friction clutch 50 (rotating in the opposite clockwise rotational direction) will be referred to as the forwardly driven friction clutch 50.

Like the output shaft 20, the input shaft 52 is rotatably supported within the casing 22 by taper bearings 70 of the type previously described hereinabove. The bearings 70 are press fit into bearing seats 72 formed in the casing 22. The bearings 70 include outer races 74 axial supported by the front 36 and rear 38 end plates of the casing 22. The bearings 70 also include inner races 75, one of which is supported axially by a hub 76 of the input gear 54 and the other of which is supported by a shoulder 78 defined by a reduced diameter portion 80 of the input shaft 52 extending into and supported by one of the bearings 70.

The input shaft 52 is parallel to the output shaft 20 and may serve as an axillary power source for powering a water pump, oil pump, blower or the like. For this purpose, a mounting bracket 82 is secured to the reduced diameter portion 80 of the input shaft 52 by a shear pin 84 for rotation of the mounting bracket 82 with the input shaft 52 for supplying power to the previously mentioned auxiliary pumps, blowers, etc. (not shown). Alternatively, the reduced diameter portion 80 of the input shaft 52 could be secured against longitudinal movement by a nut members (not shown) in a similar fashion as the output shaft 20 described previously.

A portion of the input shaft 52 extends out of the casing 22 and is splined at 86 for connection to an output shaft (not shown) of the engine 16. A lip seal 88 is disposed between the casing 22 and the input shaft 52 to prevent fluid leakage from the casing 22 and the ingress of foreign matter into the casing 22.

The casing 22 has fastener holes 88 for fastening two halves of the casing 22 together. The front end plate 36 of the casing 22 also includes fastener holes 90 for mounting the transmission assembly 12 to the engine 16. The rear end plate 38 includes threaded mounting holes 92 for mounting a prop shaft housing assembly (not shown) to the casing 22.

The clutch assembly 10 further includes coupling means 94 disposed on the output shaft 20 and movable axially therealong toward and away from the friction clutches 48, 50 and engagable therewith for selectively coupling the friction clutches 48, 50 and the output shaft 20 to rotate the output shaft 20. The coupling means 94 comprises a barrel-shaped dog or double cone 94 helically splined on the output shaft 20 between the friction clutches 48, 50 providing limited axial and rotational screw-type movement of the double cone 94 toward and away from each of the friction clutches 48, 50. The helical spline connection comprises a helically splined shaft portion 100 of the output shaft 20 separating the friction clutches 48, 50 and a corresponding mating helically splined sprocket or bore 102 formed concentrically with and extending completely through the double cone 94. The helical splining 100, 102 is preferably left handed with a standard pitch of 41°.

The double cone 94 is symmetrical and provided with a pair of conical frictional engaging surfaces 104 formed at opposite axial ends of the double cone 94 and separated by a pair of adjacent cylindrical shoulder portions 113 and a peripheral annular shifting groove 112 formed about the periphery of the double cone 94 between the shoulder portions 113 and spaced equidistant from the opposite axial ends of the double cone 94.

The frictional engaging surfaces 104 of the double cone 94 are inclined or tapered inwardly toward the axis of rotation A from their adjacent should portions 113 of the double cone 94 to the respective opposite ends of the double cone 94 at a standard cone angle of approximately 12.5° for mating surface-to-surface frictional engagement with corresponding frictional engaging surfaces 106 provided on each of the friction clutches 48, 50. The engaging surfaces 106 of the clutches 48, 50 are cup-shaped and inclined outwardly of the axis of rotation A opposite the associated engaging surfaces 104 of the double cone 94 at a standard cone angle slightly less than that of the double cone 94 of approximately 12°. This offset of approximately 0.5° in the cone angles is used to achieve good frictional engagement between the surfaces 104, 106 while permitting relatively easy disengagement of the surfaces 104, 106.

Figure 7:
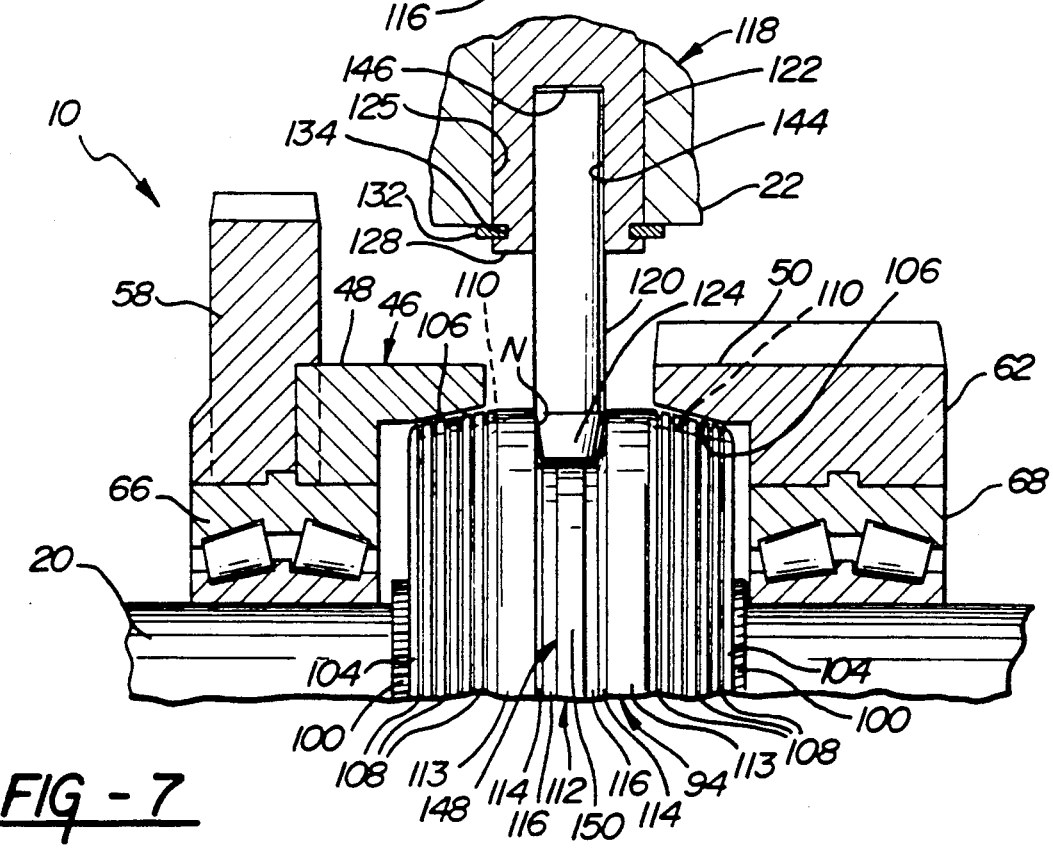
FIG. 7 is a view like FIG. 6 with the double cone shown displaced out of engagement with the friction clutches in the neutral condition.

The double cone 94 includes a plurality of annular peripheral grooves 108 formed about each of the engaging surface 104, as illustrated in FIGS. 7 and 8. FIG. 8 is an enlarged fragmentary front view of a circumscribed portion 8 of the double cone 94 shown in FIG. 7 showing the grooves 108 in greater detail. In the preferred embodiment, six such peripheral grooves 108 are spaced evenly across each of the frictional engaging surfaces 104. The double cone 94 also includes a plurality of transverse bleeding channels 110 formed along each of the engaging surfaces 104 transversely of and preferably normal to the peripheral grooves 108. The channels 110 intersect the grooves 108 forming a fluid communicating network of fluid passages on the frictional engaging surfaces 104 of the double cone 94. The bleeding channels 110 extend beyond the engaging surfaces 104 and into the cylindrical shoulder portions 113 of the double cone 94 to permit the lubricating fluid of the transmission 12 to bleed or escape from between the frictional engaging surfaces 104, 106 as they are brought into engagement with one another. That is, the fluid communication between the grooves 108 and the channels 110 prevents the fluid from becoming trapped between the double cone 94 and the clutches 48 or 50 as their respective engaging surfaces 104, 106 are forced into engagement with one another. The channels 110 are about twice as deep as the grooves 108 and are substantially wider than the grooves 110 to accommodate the fluid flow. Four such channels 112 are preferred and are equally spaced at 90° intervals about the periphery of each of the engaging surfaces 104.

The shifting groove 112 includes a pair of oppositely disposed conical side walls 114 and an eccentric bottom wall 116 joining the side walls 114 and eccentrically disposed about the axis of rotation A defining a continuously variable depth of the shifting groove 112. The side walls 114 are inclined outwardly toward the adjacent axial ends of the double cone 94 at equal and opposite predetermined angles of inclination relative to a plane normal to the axis of rotation A giving a generally V-shape appearance to the groove 112 when looking directly into the groove 112 as in FIG. 3. An angle of inclination of 5° has shown to work well. The shifting groove 112 has a continuously variable width about the periphery of the double cone 94 with a widest width at a first circumferential position W about the periphery of the double cone 94 and a narrowest width spaced about 180° from the first circumferential position at a second circumferential position N about the periphery of the double cone 94. In other words, the spacing between the side walls 114 is greatest at the first circumferential position W and gradually and continuously decreases about the periphery of the double cone 94 until it reaches the second circumferential position N, where the spacing between the side walls 114 is narrowest.

As can be seen in FIG. 4, the bottom wall 116 is circular in cross section and is off center or eccentric on the double cone 94 such that as the double cone 94 rotates, the bottom wall 116 reciprocates inwardly and outwardly relative to the axis of rotation A. The bottom wall 116 is closest to the axis of rotation A at the first circumferential position W and gradually is spaced further from the axis A until it reaches a greatest distance from the axis A at the second circumferential position N. Thus, the shifting groove 112 has its greatest depth at the first circumferential position W and the least depth at the second circumferential position N.

The assembly 10 further comprises shift means 118 disposed in the shifting groove 112 and moveable along the axis of rotation A to selectively engage the side walls 114 of the shifting groove 112 for shifting the double cone 94 into and out of engagement with the friction clutches 48, 50. The shift means 118 comprises an elongated cylindrical shifting pin 120 rotatably and eccentrically supported in a control shaft 122 and extending substantially radially toward the axis of rotation A with a tapered conical distal end portion 124 thereof extending a predetermined extended distance into the shifting groove 112 for controlled rolling engagement with either of the side walls 114 of the shifting groove 112. The control shaft 122 is a substantially cylindrical elongated solid member rotatably supported within a cylindrical passageway 125 of a support structure, such as the casing 22 of the transmission assembly 12, and extends completely through the casing 22 with a portion 126 of the control shaft 122 extending outwardly of the casing 22 and with another portion 128 extending interiorly of the casing 22 toward the axis of rotation A. A lip seal 130 is provided between the casing 22 and the control shaft 122 for preventing fluid leakage from the transmission assembly 12 and for preventing the ingress of foreign matter into the transmission assembly 12. The control shaft 122 further includes a snap ring 132 disposed in an annular snap ring groove 134 formed on the interior portion 128 of the control shaft 122 for preventing the control shaft 122 from being removed or being pulled out of the cassing 22 when the snap ring 132 is locked in position. The snap ring 132 acts as a barrier between the control shaft 122 and the interior surface of the casing 22 for limiting the longitudinal axial movement of the control shaft 122 outwardly of the casing 22.

The assembly 10 is further provided with remotely actuated control means 136 connected to the control shaft 122 for selectively rotating the control shaft 122 in opposite first and second directions to linearly displace the shifting pin 120 in opposite directions along the axis of rotation A. Specifically, the control means 136 comprises a lever or control arm 138 secured to an extending radially outwardly from the control shaft 122 to a distal free end 140. The free end 140 of the control arm 138 is provided with a knob 142 for attaching the control arm 138 to a push-pull motion transmitting remote control cable assembly (not shown) for pivoting the control arm 138 about the rotational axis of the control shaft 122 and thereby rotating the control shift 122 within the cylindrical passageway 125 of the casing 22. The control arm 138 also limits the longitudinal axial movement of the control shaft 122 into the casing 22. In this manner, the control shaft 122 is captured within the casing 22 between the snap ring 122 and the control arm 138.

As shown best in FIG. 4, the shifting pin 120 is rotatably supported within a cylindrical splined bore or socket 144 formed in the control shaft 122. The bore 144 includes a bottom wall 146 for limiting the extension of the shifting pin 120 into the bore 144. That is, the shifting pin 120 bottoms out against the bottom wall 146 when inserted fully into the bore 144. The distal end portion 124 of the shifting pin 120 is correspondingly tapered at the same angle of inclination as the side walls 114 of the shifting groove 112 for line contact between the tapered distal end portion 124 of the shifting pin 120 and the side walls 114 when the pin 120 is engaged with the side walls 114.

The assembly 10 also includes annular ridge means or a ridge 148 disposed within the shifting groove 112 concentrically about the axis of rotation A and having a concentric top annular surface 150 defining a uniform depth of the shifting groove 112 at least partially above the eccentric bottom wall 146 of the groove 112 for continuously limiting the extension of the shifting pin 120 into the groove 112 beyond the top surface 150 of the ridge 148. As shown best in FIG. 4, the top surface 150 of the ridge 148 is spaced a greatest distance from the eccentric bottom wall 116 at the first circumferential position W about the periphery of the double cone 94 and is substantially tangent to the eccentric bottom wall 116 at the second circumferential position N about the periphery of the double cone 94. In other words, the ridge 148 has a continuously variable height relative to the eccentric bottom 116 due to the eccentricity of the bottom wall 116 such that the top surface 150 of the ridge 148 is substantially flush with the bottom wall 116 at the second circumferential position N and gradually increases to a greatest height above the bottom wall 116 at the first circumferential position W. The ridge 148 has a predetermined substantially uniform width narrower than the width of the groove 112 which acts at a barrier to prevent the shifting pin 120 from extending into the shifting groove 112 beyond the top surface 150 so that the shifting pin 120 cannot become lodged or wedged within the groove 112 between the side walls 114 of the groove 112. In the preferred embodiment, the ridge 148 is formed eccentrically within the shifting groove 112 as an integral upstanding ring or collar extending upwardly from the eccentric bottom wall 116 and is spaced equally from each of the side walls 114 of the shifting groove 112.

To form the annular peripheral shifting groove 112, the double cone 94 is mounted eccentrically in a metal lathe and a fork-shaped tapered cutting tool corresponding to the cross sectional shape of the shifting groove 112 at the first circumferential position W (i.e., the shape of the groove 112 at the top of FIG. 4) is presented radially inwardly toward the double cone 94 forming the eccentric bottom wall 146 and the ridge 148. Thereafter, the double cone 94 is mounted concentrically within the lathe and the concentric top surface 150 of the ridge 148 is formed.

The tapered distal end portion 124 of the shifting pin 120 has a width slightly smaller than the narrowest width of the shifting groove 112 at the second circumferential position N of the double cone 94. More specifically, the smallest spacing between the tapered distal end portion 124 of the shifting pin 120 and the side walls 114 of the shifting groove 112 is preferably no less than 0.002 inches (i.e., enough to permit a film of lubricating fluid to remain between the side walls 114 and the pin 120).

The bottom wall 146 of the blind bore 144 of the control shaft 122 is spaced a predetermined distance from the concentric top surface 150 of the ridge 148. The shifting pin 120 is disposed in the blind bore 144 and extends between the bottom wall 146 of the bore 144 and the concentric top surface 150 of the ridge 148. The shifting pin 120 has an end-to-end length slightly less than the spacing between the bottom wall 146 and the top surface 150 of the ridge 148 so that the pin 120 is able to "float" or shift axially a small distance between the bottom wall 146 and the top surface 150 of the ridge 148. A difference in length of 0.002 inches has shown to work well and permits a film of lubricating fluid to remain between the shifting pin 120 and the top surface 150 of the ridge 148 and between the shifting pin 120 and the bottom wall 146 of the bore 144.

In operation, the double cone 94 is moveable between a neutral, forward and reverse position on the output shaft 20. In the neutral position (FIG. 1) the reversely driven friction clutch 48 is being continuously rotated on the output shaft 20 in a reverse rotational direction. The forwardly driven friction clutch 50 is also being continuously rotated on the output shaft 20 but in an opposite forward rotational direction and the output shaft 20 is idle and nonrotating.

To rotate the output shaft, and thus propel the vessel 14 in either a forward or reverse direction, the control arm 138 on the control shaft 122 is actuated by the motion transmitting remote control cable assembly (not shown) to selectively rotate the control shaft 122 either clockwise or counter clockwise. Depending upon the direction of rotation, the eccentrically mounted shifting pin 120 is displaced toward and into engagement with one of the side walls 114 of the shifting groove 112 causing the double cone 94 to advance toward either the forwardly 50 or reversely 48 driven friction clutch. Upon further advancement, one of the conical friction surfaces 104 of the double cone 94 engages the associated conical friction surface 106 of either the forwardly 50 or reversely 48 driven friction clutch. At the moment of engagement, the double cone 94 begins to rotate with the clutch 48 or 50 as does the output shaft 20. The resistance to rotation of the propeller 42 in the water produces torque on the prop shaft 18 which is transferred to the output shaft 20. This resistance to rotation of the output shaft 20 causes the double cone 94 to advance along the helical spline 100, 102 toward and into further engagement with the engaged friction clutch 48 or 50. As the torque increases, so does the force of engagement. In this manner, the double cone 94 and the engaged clutch 48 or 50 are positively and firmly engaged. The double cone 94 thus couples either one or the other of the friction clutches 48, 50 with the rotatable output shaft 20 to rotate the output shaft 20 in either a forward or reverse rotational direction.

When the double cone 94 is in either the forward or reverse engaged condition (i.e., engaged with either the forwardly driven 50 or reversely driven 50 clutch), it is continuously rotating relative to the stationary shifting pin 120 riding in the groove 112. In this manner, the eccentric bottom 116 of the groove 112 reciprocates toward and away from the distal end 124 of the shifting pin 120. Normally, this would allow the shifting pin 120 to extend or advance into the groove and follow the eccentricity of the bottom wall 116 as the double cone 94 rotates, thus reciprocating the shifting pin 120 inwardly and outwardly in the groove 112. However, this condition is undesirable because as the shifting pin 120 advances into the groove 112, it is likely to become lodged or wedged between the side walls 114 of the groove 112 resulting in poor performance and/or possible damage to the assembly 10. To prevent the shifting pin 120 from extending too far into the groove 112, the double cone 94 of the present invention includes the central ridge 148 disposed in the groove and provided with a concentric top surface 150 for limiting the extension of the shifting pin 120 into the groove 112 beyond the concentric top surface 150 of the ridge 148. Thus, the shifting pin 120 does not continuously follow the eccentric bottom wall 116 and thus does not axially reciprocate inwardly and outwardly in the groove 112. Rather, the concentric top surface 150 of the ridge 148 enables the shifting pin 120 to ride smoothly within the groove 112 and "float" between the concentric top surface 150 of the ridge 148 and the bottom wall 146 of the cylindrical bore 144 of the control shaft 122 within the small inch 0.002 inch spacing. Thus, there is virtually no axial reciprocation of the shifting pin 120 within the groove 112.

To disengage the double cone 94 from either the reversely 48 or forwardly 50 driven friction clutch, both the force of the frictional engagement and the continually applied torque of the output shaft 20 must be overcome before disengagement will be successful. To reduce the applied torque force on the output shaft 20, the engine rpm's should be decreased (i.e., the engine slowed) prior to shifting. However, an amount of torque always remains and must be overcome before disengagement can be accomplished.

Figure 6:
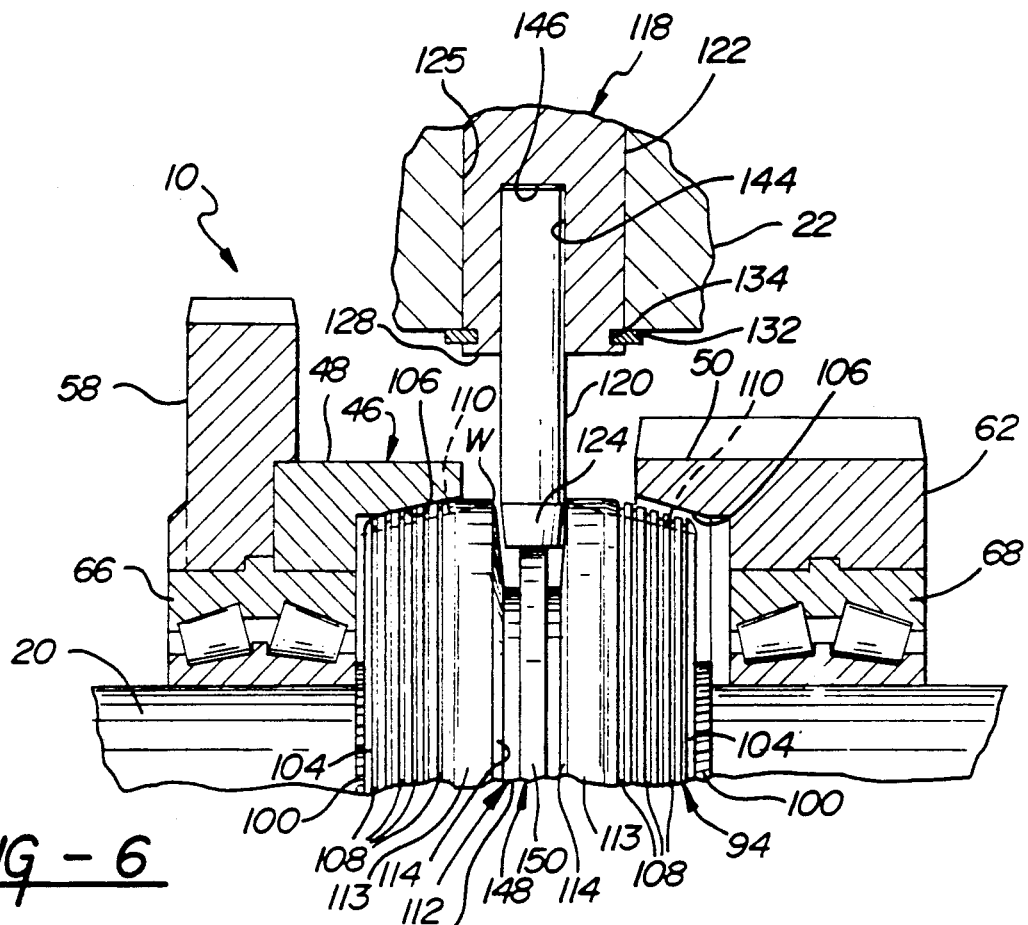
FIG. 6 is a fragmentary front view of a subject reversing clutch mechanism shown partially in cross section with the double cone engaged with the reversely driven friction clutch.

To accomplish disengagement, the present invention takes advantage of the rotational power provided by the engine 16. Specifically, the present invention utilizes the tremendous leverage provided by the camming action of the rotating, axially reciprocating side walls 114 of the shifting groove 112 in combination with the stationary shifting pin 120 to successfully disengage the double cone 94 from one of the friction clutches 48 or 50 and place the double cone 94 in the neutral condition. For example, FIG. 6 shows the double cone 94 engaged with the reversely driven friction clutch 48. In this condition, the double cone 94 is continuously rotating with the friction clutch 48 relative to the stationary shifting pin 120. To disengage the double cone 94, the control arm 138 is actuated by the motion transmitting remote control cable assembly (not shown) to rotate the control shaft 122 and urge the eccentrically mounted shifting pin 120 toward and into engagement with the side wall 114 of the shifting groove 112 opposite the reversely driven friction clutch 48. As the double cone 94 continues to rotate, the side wall 114 reciprocates toward the shifting pin 120. That is, as the double cone 94 rotates from a position in which the widest portion W of the groove 112 is in contact with the shifting pin 20 to a position in which the narrowest portion N of the groove 112 is brought into contact with the pin 120, the camming action of the side wall 114 (continuously in contact with the stationary pin 120) urges the double cone 94 away from and out of engagement with the clutch 48 as shown in FIG. 7. When using the present invention, the disengaging force on the control cable (not shown) necessary to disengage the double cone 94 has shown to be only 3 ft-lbs.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A clutch assembly (10) comprising:
   a rotatable output shaft (20) defining an axis of rotation (A);
   continuously driven clutch means (46) freely rotatably disposed on said output shaft (20);
   coupling means (94) disposed on said output shaft (20) and moveable axially therealong toward and away from said clutch means (46) and engagable therewith for selectively coupling said clutch means (46) and said output shaft (20) to rotate said output shaft (20), said coupling means (94) including a peripheral shifting groove (112) defined by a pair of side walls (114) which are oppositely inclined with respect to a plane normal to said axis of rotations (A) and an eccentric bottom wall (116) eccentrically disposed about said axis (A) and defining a variable depth of said groove (112);
   shift means (118) disposed in said groove (112) and moveable along said axis (A) to selectively engage said side walls (114) for shifting said coupling means (94) into and out of engagement with said clutch means (46);
   said assembly characterized by including annular ridge means (148) disposed in said shifting groove (112) concentrically about said axis (A) and having a concentric top surface (150) defining a uniform depth of said groove (112) at least partially above said eccentric bottom wall (116) of said groove (112) for continuously limiting the extension of said shift means (118) into said groove (112) beyond said top surface (150) of said ridge means (148).

2. An assembly as set forth in claim 1 further characterized by said shifting groove (112) having a continuously variable width with a widest width at a first circumferential position (W) about the periphery of said coupling means (94) and a narrowest width spaced about 180° from said first position at a second circumferential position (N) about the periphery of said coupling means (94).

3. An assembly as set forth in claim 2 further characterized by said top surface (150) of said ridge means (148) being spaced from said eccentric bottom wall (116) a greatest distance at said first circumferential position (W).

4. An assembly as set forth in claim 3 further characterized by said top surface (150) of said ridge means (148) being substantially tangent to said eccentric bottom wall (116) at said second circumferential position (N).

5. An assembly as set forth in claim 4 further characterized by at least a portion of said shifting means (118) extending generally radially toward said output shaft (20) a predetermined extended distance into said shifting groove (112) generally equal to said uniform depth of said groove (112).

6. An assembly as set forth in claim 5 further characterized by said ridge means (148) comprising a generally upstanding annular central ridge (148) extending generally from said bottom wall (116) radially of said axis of rotation (A).

7. An assembly as set forth in claim 6 further characterized by said top surface (150) of said ridge (148) having a generally uniform width.

8. An assembly as set forth in claim 7 further characterized by said ridge (148) being spaced from and disposed equidistant from each of said side walls (114).

9. An assembly as set forth in claim 8 further characterized by said side walls (114) being conical and having equal and opposite predetermined angles of inclination.

10. An assembly as set forth in claim 9 further characterized by said clutch means (46) comprising a pair of friction clutches (50, 48) rotatably disposed on said output shaft (20) and continuously driven in opposite forward and reverse rotational directions respectively.

11. An assembly as set forth in claim 10 further characterized by said coupling means (94) being disposed between said forwardly (50) and said reversely (48) driven clutches for selective engagement with said forwardly driven clutch (50) for rotating said output shaft (20) in said forward rotational direction and selectively engagable with said reversely driven clutch (48) for rotating said output shaft (20) in said reverse rotational direction.

12. An assembly as set forth in claim 11 further characterized by said clutches (48, 50) including conical frictional engaging surfaces (106).

13. An assembly as set forth in claim 12 further characterized by said coupling means (94) comprising a double cone (94) having a pair of conical frictional engaging surfaces (104) at opposite axial ends thereof for selective frictional engagement with respective said conical frictional engaging surfaces (106) of said clutches (48, 50).

14. An assembly as set forth in claim 13 further characterized by including a helical spline connection (100, 102) between said double cone (94) and said output shaft (20).

15. An assembly as set forth in claim 14 further characterized by said shift means (118) comprising a shifting pin (120) having a distal end portion (124) thereof extended into said shifting groove (112).

16. An assembly as set forth in claim 15 further characterized by said shifting pin (120) being an elongated cylindrical member rotatably supported in a control shaft (122) for controlled rolling engagement with said side walls (114) of said shifting groove (112).

17. An assembly as set forth in claim 16 further characterized by said distal end portion (124) of said pin (120) being tapered correspondingly to said angle of inclination of said side walls (114) of said shifting groove (112 for line contact between said tapered distal end portion (124) and said side walls (114) When said pin (120) is engaged with said side walls (114).

18. An assembly as set forth in claim 17 further characterized by said pin (120) being eccentrically supported in said control shaft (122).

19. An assembly as set forth in claim 18 further characterized by said control shaft (122) being rotatably supported within a support structure (22).

20. An assembly as set forth in claim 19 further characterized by including remotely actuated control means (136) connected to said control shaft (122) for selectively rotating said control shaft (122) in opposite directions for moving said pin (120) in opposite directions along said axis of rotation (A).

21. An assembly as set forth in claim 20 further characterized by said distal end portion (124) of said shifting pin (120) having a width relatively narrower than narrowest width (N) of said shifting groove (122).

22. An assembly as set forth in claim 21 further characterized by said shifting pin (120) being received within a cylindrical blind bore (144) formed in said control shaft (122), said blind bore (144) having a bottom wall (146) spaced a predetermined distance from said top surface (150) of said ridge (148).

23. An assembly as set forth in claim 22 further characterized by said pin (120) having an end-to-end length slightly less than said spacing between said bottom wall (146) of said bore (144) and said top surface (150) of said ridge (148).

24. An assembly as set forth in claim 23 further characterized by said conical frictional engaging surfaces (104) of said double cone (94) provided with a plurality annular peripheral grooves (108).

25. An assembly as set forth in claim 24 further characterized by said conical frictional engaging surfaces (104) of said double cone (94) further provided with a plurality of transverse bleeding channels (110) disposed transversely of and intersecting said peripheral grooves (108).

26. An assembly as set forth in claim 25 further characterized by said shifting groove (112) being equidistant from said axial ends of said double cone (94).

27. An assembly as set forth in claim 26 further characterized by said remotely actuated control means (136) comprising a lever (138) extending from said control shaft (122).

28. A clutch assembly (10) comprising:
   a rotatable output shaft (120) defining an axis of rotation (A);
   a pair of friction clutches (50, 48) rotatably disposed on said output shaft (20) and continuously driven in opposite forward and reverse rotational directions, each of said friction clutches (48, 50) including a conical frictional engaging surface (106);
   a double cone (94) helically splined on said output shaft (20) between said friction clutches (48, 50) and moveable along said output shaft (20) toward and away from said friction clutches (48, 50), said double cone (94) including conical frictional engaging surfaces (104) at opposite axial ends thereof with each engaging surface (104) being cooperatively engagable with an associated said engaging surface (106) of each of said clutches (48, 50) for selectively coupling said forwardly driven clutch (50) and said output shaft (20) to rotate said output shaft (20) in said forward rotational direction and for selectively coupling said reversely driven clutch (48) and said output shaft (20) to rotate said output shaft (20) in said reverse rotational direction, said double cone (94) including a peripheral shifting groove (112) defined by a pair of oppositely disposed conical side walls (114) which are oppositely inclined with respect to a plane normal to said axis of rotation (A) and an eccentric bottom wall (116) eccentrically disposed about said axis of rotation (A) and defining a continuously variable depth of said shifting groove (112);

an elongated shifting pin (120) having a distal end portion (124) extending a predetermined distance into said shifting groove (112), said shifting pin (120) being eccentrically mounted for movement along said axis of rotation (A) toward and away from said side walls (114) of said groove (112), said distal end portion (124) of said pin (120) being selectively engagable with said side walls (114) for urging said double cone (94) into and out of engagement with said friction clutches (48, 50);

said assembly characterized by including a central ridge (148) disposed in said groove (112) concentrically about said axis of rotation (A) and having a concentric top surface (150) defining a uniform depth of said groove (112) at least partially spaced above said eccentric bottom wall (116) of said groove (112), said concentric top surface (150) continuously limiting the extension of said shifting pin (120) into said groove (112) beyond said top surface (150) of said ridge (148).

* * * * *